(12) United States Patent
Gardner et al.

(10) Patent No.: US 10,777,366 B2
(45) Date of Patent: Sep. 15, 2020

(54) METHOD OF INCREASING AN ENERGY DENSITY AND AN ACHIEVABLE POWER OUTPUT OF AN ENERGY STORAGE DEVICE

(71) Applicant: Intel Corporation, Santa Clara, CA (US)

(72) Inventors: Donald S. Gardner, Los Altos, CA (US); Zhaohui Chen, San Jose, CA (US); Wei C. Jin, San Diego, CA (US); Scott B. Clendenning, Portland, OR (US); Eric C. Hannah, Pebble Beach, CA (US); Tomm V. Aldridge, Olympia, WA (US); John L. Gustafson, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/936,427

(22) Filed: Mar. 26, 2018

(65) Prior Publication Data

US 2019/0103229 A1    Apr. 4, 2019

Related U.S. Application Data

(63) Continuation of application No. 13/977,131, filed as application No. PCT/US2011/054372 on Sep. 30, 2011, now abandoned.

(51) Int. Cl.
*H01G 11/26*    (2013.01)
*H01G 11/86*    (2013.01)
(Continued)

(52) U.S. Cl.
CPC ............ *H01G 11/26* (2013.01); *H01G 11/14* (2013.01); *H01G 11/30* (2013.01); *H01G 11/86* (2013.01); *H01G 11/58* (2013.01); *Y02E 60/13* (2013.01)

(58) Field of Classification Search
CPC ........ H01G 11/14; H01G 11/86; H01G 11/30; H01G 11/26; H01G 11/58
See application file for complete search history.

(56) References Cited

U.S. PATENT DOCUMENTS 5,811,205 A    9/1998    Andrieu et al.
6,287,630 B1   9/2001    Strange et al.
(Continued)

FOREIGN PATENT DOCUMENTS

CN    101996775    3/2011
JP    H7-153444    11/1993
(Continued)

OTHER PUBLICATIONS

Bacsa et al.; "Low-Temperature Synthesis of $BaTiO_3$ Thin Films on Silicone Substrates by Hydrothermal Reaction;" Applied Physics Letters; (Aug. 23, 1993); pp. 1053-1055; vol. 63, Issue 8; <doi: 10.1063/1.109831 >.
(Continued)

*Primary Examiner* — David M Sinclair
(74) *Attorney, Agent, or Firm* — Green, Howard & Mughal LLP (57) ABSTRACT

Methods of increasing an energy density of an energy storage device involve increasing the capacitance of the energy storage device by depositing a material into a porous structure of the energy storage device using an atomic layer deposition process, by performing a procedure designed to increase a distance to which an electrolyte penetrates within channels of the porous structure, or by placing a dielectric
(Continued)

material into the porous structure. Another method involves annealing the energy storage device in order to cause an electrically conductive substance to diffuse to a surface of the structure and form an electrically conductive layer thereon. Another method of increasing energy density involves increasing the breakdown voltage and another method involves forming a pseudocapacitor. A method of increasing an achievable power output of an energy storage device involves depositing an electrically conductive material into the porous structure.

7 Claims, 6 Drawing Sheets

(51) Int. Cl.
  *H01G 11/58* (2013.01)
  *H01G 11/14* (2013.01)
  *H01G 11/30* (2013.01)

(56) References Cited

U.S. PATENT DOCUMENTS

| | | | |
|---|---|---|---|
| 6,468,317 B1 | 10/2002 | Strange et al. | |
| 7,486,497 B2 | 2/2009 | Kobayashi et al. | |
| 8,237,538 B2* | 8/2012 | Braun | C25F 3/02 338/20 |
| 8,405,956 B2 | 3/2013 | Dreissig et al. | |
| 8,599,533 B2 | 12/2013 | Haight et al. | |
| 2003/0086238 A1 | 5/2003 | Bendale et al. | |
| 2003/0165741 A1 | 9/2003 | Maly-Schreiber et al. | |
| 2004/0070921 A1 | 4/2004 | Ikeda et al. | |
| 2005/0153130 A1* | 7/2005 | Long | C25D 13/12 428/357 |
| 2005/0262675 A1 | 12/2005 | Sun | |
| 2006/0021649 A1 | 2/2006 | Kuroda et al. | |
| 2008/0248192 A1 | 10/2008 | Long et al. | |
| 2009/0108252 A1 | 4/2009 | Banerjee et al. | |
| 2009/0122460 A1* | 5/2009 | Gschwandtner | H01G 4/008 361/305 |
| 2010/0123993 A1* | 5/2010 | Laor | B01J 37/0238 361/303 |
| 2010/0176767 A1 | 7/2010 | Long et al. | |
| 2011/0051322 A1* | 3/2011 | Pushparaj | C23C 16/24 361/525 |
| 2011/0075324 A1 | 3/2011 | Singh | |
| 2011/0255214 A1* | 10/2011 | Gruner | B82Y 30/00 361/502 |
| 2013/0196235 A1 | 8/2013 | Prieto et al. | |
| 2014/0072876 A1 | 3/2014 | Pushparaj et al. | |
| 2014/0093782 A1 | 4/2014 | Gardner et al. | |

FOREIGN PATENT DOCUMENTS

| | | |
|---|---|---|
| JP | H09-017426 | 1/1997 |
| JP | 2000/114127 | 4/2000 |
| JP | 2001-118601 | 4/2001 |
| JP | 2004-327330 | 4/2003 |
| JP | 2004-281593 | 10/2004 |
| JP | 2005-026522 | 1/2005 |
| JP | 2005136401 A | 5/2005 |
| JP | 2005/142381 | 6/2005 |
| JP | 2007-096048 | 9/2005 |
| JP | 2007-123315 | 10/2005 |
| JP | 2006-156337 | 6/2006 |
| JP | 2008-522401 | 6/2008 |
| JP | 2008/277790 A | 11/2008 |
| JP | 2010-170878 | 1/2009 |
| JP | 2009-032693 | 2/2009 |
| KR | 2000/0048961 | 7/2000 |
| RU | 2400851 C1 | 9/2010 |
| TW | I330388 | 9/2010 |
| WO | WO 2005/022568 A1 | 3/2005 |
| WO | WO 2006/051772 A1 | 5/2006 |
| WO | WO 2006/056959 | 6/2006 |
| WO | WO 2008/020649 A1 | 2/2008 |
| WO | WO 2010/080653 A1 | 7/2010 |
| WO | WO 2010/093761 | 8/2010 |
| WO | WO 2010/101819 | 9/2010 |
| WO | WO 2011/028613 | 3/2011 |
| WO | WO 2011/053736 | 5/2011 |
| WO | WO 2011123135 A1 | 10/2011 |
| WO | WO 2012/033570 | 3/2012 |

OTHER PUBLICATIONS

Mitani et al.; "Contrast Structure and EDLC Performances of Activated Spherical Carbons with Medium and Large Surface Areas;" Electrochimica Acta; (Jul. 28, 2006); pp. 5487-5493; vol. 51, Issue 25; <doi: 10.1016/j.electacta.2006.02.040 >.

* cited by examiner

METHOD OF INCREASING AN ENERGY DENSITY AND AN ACHIEVABLE POWER OUTPUT OF AN ENERGY STORAGE DEVICE

PRIORITY DATA

This application is a continuation of U.S. patent application Ser. No. 13/977,131, filed on Jun. 28, 2013, which is a U.S. nationalization of International Patent Application No. PCT/US2011/054372, filed on Sep. 30, 2011, each of the above applications is incorporated herein by reference.

FIELD OF THE INVENTION

The disclosed embodiments of the invention relate generally to energy storage devices, and relate more particularly to methods of enhancing the performance of energy storage devices.

BACKGROUND OF THE INVENTION

Modern societies depend on the ready availability of energy. As the demand for energy increases, devices capable of efficiently storing energy become increasingly important. As a result, energy storage devices, including batteries, capacitors, pseudocapacitors, ultracapacitors, hybrid ultracapacitors, and the like are being extensively used in the electronics realm and beyond. In particular, capacitors are widely used for applications ranging from electrical circuitry and power delivery to voltage regulation and battery replacement. Electric double-layer capacitors (EDLCs), also referred to as ultracapacitors (among other names), are characterized by high energy storage capacity as well as other desirable characteristics including high power density, small size, and low weight, and have thus become promising candidates for use in several energy storage applications. Because the energy of a capacitor depends on the capacitance and the voltage as shown in Equation 1, $$E = \tfrac{1}{2} C V^2 \qquad [\text{Eq. 1}]$$

increasing the capacitance and/or (especially) the voltage of an ultracapacitor will result in an increase in energy storage capacity and energy density. Other parameters affecting ultracapacitor performance may also be targeted for improvement.

BRIEF DESCRIPTION OF THE DRAWINGS

The disclosed embodiments will be better understood from a reading of the following detailed description, taken in conjunction with the accompanying figures in the drawings in which.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions unless otherwise indicated either specifically or by context. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

In the related case referenced above (International Application No. PCT/US2010/029821), there was disclosed an energy storage device (referred to there as a charge storage device) comprising at least one electrically conductive structure that includes a porous structure containing multiple channels, each one of which has an opening to a surface of the porous structure. (These channels typically, according to embodiments of the invention, have aspect ratios (length to diameter) of 100 or greater.) Such energy storage devices will again be described in detail in the present disclosure. Embodiments of the present invention are directed to enhancing the performance, and in particular the energy density and the achievable power output, of an energy storage device of a type such as is described herein and in the related case. Many of the methods disclosed herein are directed to the deposition or other application of various substances and materials into high aspect ratio channels.

As used herein, the term "energy storage device" explicitly includes EDLCs (ultracapacitors), hybrid ultracapacitors, and pseudocapacitors, all of which are discussed in more detail below, as well as batteries, fuel cells, and similar devices that store energy.

Although they operate according to similar principles, ultracapacitors differ from conventional parallel plate capacitors in certain important respects. One significant difference concerns the charge separation mechanism: for ultracapacitors this typically takes the form of a so-called electric double layer, or EDL, rather than of the dielectric of a conventional capacitor. The EDL is created by the electrochemical behavior of ions at an interface between a high-surface area electrode and an electrolyte, and results in an effective separation of charge in spite of the fact that the layers are so close together. (Physical separation distances are on the order of a single nanometer.) Thus, a typical ultracapacitor may be thought of as storing charge in its EDL. Each layer of the EDL is electrically conductive but the properties of the double layer prevent current from flowing across the boundary between them. (The EDL is further discussed below in connection with FIG. 6.)

As is true in conventional capacitors, capacitance in an ultracapacitor is proportional to the surface area of the electrodes. Thus, one could make a very high-capacitance capacitor using, for example, a porous silicon electrode oxidized with silicon dioxide ($SiO_2$) along with a metal or polysilicon structure as the other electrode. The very high surface area of the porous silicon would be a major contributor to the high capacitance that could be achieved with such a capacitor. The capacitance could be increased still further—even significantly increased—by placing an electrolyte 150 in physical contact with the porous structure, thereby introducing an EDL.

Electrolyte 150 (as well as other electrolytes described herein) is represented in the drawings using a random arrangement of circles. This representation is intended to convey the idea that the electrolyte is a substance (liquid or solid) containing free ions. The circles were chosen for convenience and are not intended to imply any limitation as to the electrolyte components or qualities, including any limitation with respect to the size, shape, or number of the ions. One type of electrolyte that may be used in accordance with embodiments of the invention is an ionic liquid. Another is an electrolyte (e.g., $Li_2SO_4$, $LiPF_6$) comprising an ion-containing solvent. Organic electrolytes and solid-state electrolytes are also possible.

Pseudocapacitors are energy storage devices that behave like capacitors but also exhibit reactions that result in charge storage. Typically, one of the electrodes of a pseudocapacitor is coated with a transition metal oxide such as $MnO_2$, $RuO_2$, $NiO_x$, $Nb_2O_5$, $V_2O_5$, etc., or with other materials including WC (tungsten carbide), any suitable conducting polymer, or a similar material. These materials can be used with an electrolyte such as potassium hydroxide (KOH); when the device is charged the potassium will react with the material in a reaction that allows energy to be stored in a manner similar to a battery's energy storage mechanism. More specifically, these materials store energy through highly-reversible surface redox (faradic) reactions, but at the same time the electric double layer energy storage mechanism remains in place and provides the potential for high power. A potential downside of a pseudocapacitor is that they, like batteries, may degrade, thus allowing only a few hundred to a few thousand discharge cycles.

Hybrid ultracapacitors are energy storage devices that combine the attributes of ultracapacitors and batteries. In one example, an electrode coated with a lithium ion material is combined with an ultracapacitor in order to create a device that has an ultracapacitor's rapid charge and discharge characteristics and a battery's high energy density. On the other hand, hybrid ultracapacitors, like batteries and pseudocapacitors, have shorter expected lifespans than do ultracapacitors.

In one embodiment of the invention, a method of increasing an energy density of an energy storage device comprises increasing the capacitance of the energy storage device by depositing a material into the porous structure using an atomic layer deposition process and adjusting at least one of a pressure and an exposure time of the atomic layer deposition process based on an aspect ratio of at least one of the channels. In another embodiment, the method comprises increasing the capacitance by performing a procedure designed to increase a distance to which an electrolyte penetrates within the channels. In another embodiment, the method comprises increasing the capacitance by placing a dielectric material into the porous structure. In still another embodiment, a method of increasing the energy density comprises adding a transition metal oxide to an ultracapacitor in order to create a pseudocapacitor, and in yet another embodiment, the method comprises increasing the breakdown voltage.

In another embodiment, the electrically conductive structure of the energy storage device further comprises an alloy composed at least in part of a first substance and an electrically conductive second substance, and the method comprises annealing the energy storage device in order to cause the electrically conductive second substance to diffuse to a surface of the electrically conductive structure and form an electrically conductive layer thereon. In another embodiment, a method of increasing an achievable power output of an energy storage device comprises depositing an electrically conductive material into the porous structure.

Figure 1:
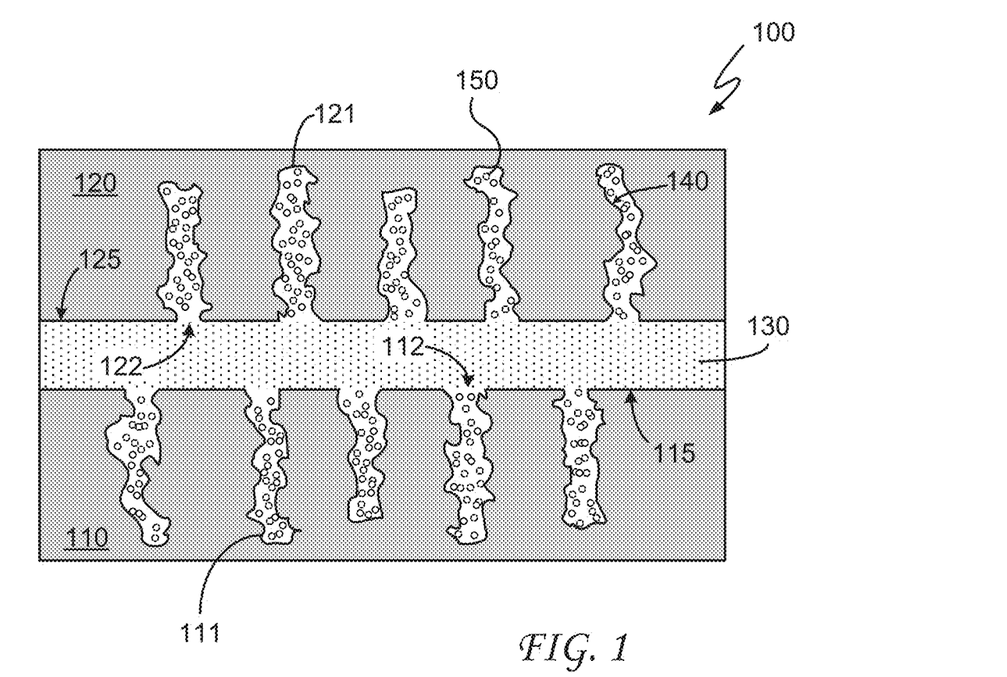
FIGS. 1 and 2 are cross-sectional views of an energy storage device according to embodiments of the invention.
Figure 2:
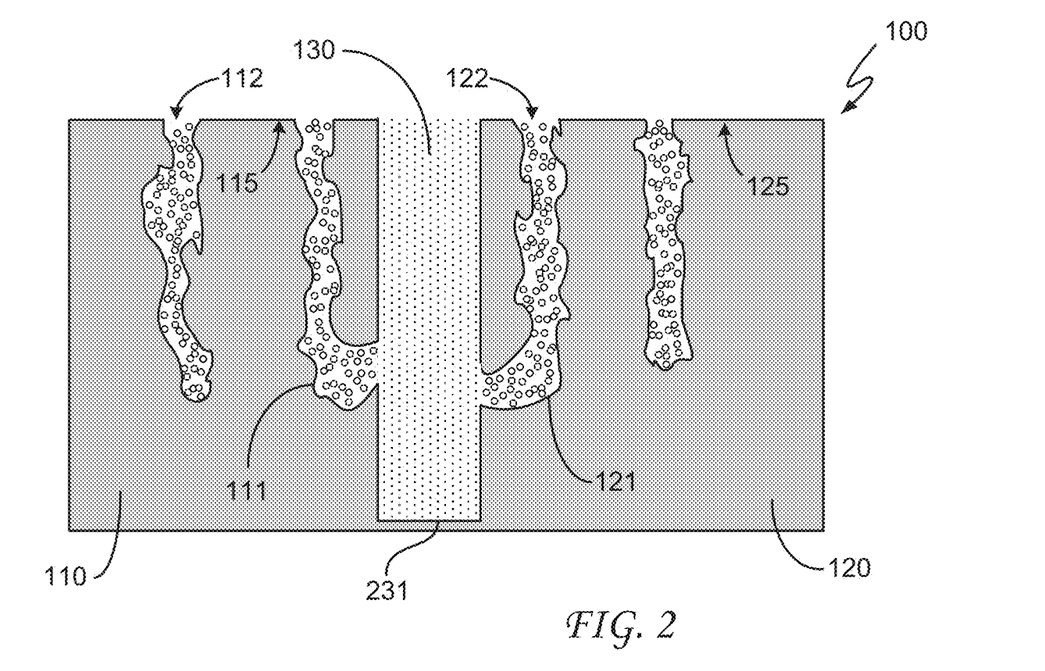

Referring now to the drawings, FIGS. 1 and 2 are cross-sectional views of an energy storage device 100 to which methods according to embodiments of the invention are directed. As illustrated in FIGS. 1 and 2, energy storage device 100 comprises an electrically conductive structure 110 and an electrically conductive structure 120 separated from each other by a separator or insulator 130. Insulator 130 prevents electrically conductive structures 110 and 120 from physically contacting each other so as to prevent an electrical short circuit. In other embodiments, for reasons discussed below, a separator is not necessary and can be omitted.

At least one of electrically conductive structures 110 and 120 comprises a porous structure containing multiple channels, each one of which has an opening to a surface of the porous structure. As an example, the porous structure may be formed within a conductive or a semiconductive material. Alternatively, the porous structure may be formed within an insulating material (e.g., alumina) that has been coated with an electrically conductive film (e.g., an ALD conductive film such as TiN). In this regards, materials having greater electrical conductivity are advantageous because of their lower effective series resistance. In the illustrated embodiments both electrically conductive structure 110 and electrically conductive structure 120 comprise such a porous structure. Accordingly, electrically conductive structure 110 comprises channels 111 with openings 112 to a surface 115 of the corresponding porous structure and electrically conductive structure 120 comprises channels 121 with openings 122 to a surface 125 of the corresponding porous structure. In an embodiment where only one of electrically conductive structures 110 and 120 comprises a porous structure with multiple channels, the other electrically conductive structure can be, for example, a metal electrode or a polysilicon structure.

Various configurations of energy storage device 100 are possible. In the embodiment of FIG. 1, for example, energy storage device 100 comprises two distinct porous structures (that is, electrically conductive structure 110 and electrically conductive structure 120) that have been bonded together face-to-face with separator 130 in between. As another example, in the embodiment of FIG. 2 energy storage device 100 comprises a single planar porous structure in which a first section (electrically conductive structure 110) is separated from a second section (electrically conductive structure 120) by a trench 231 containing separator 130. One of the electrically conductive structures will be the positive side and the other electrically conductive structure will be the negative side. Separator 130 permits the transfer of ions but prevents the electrodes from physically contacting each other (which could cause an electrical malfunction in the device). As an example, a porous plastic material could be used as separator 130. It should be noted that the separator, although shown in FIG. 2, may not be necessary in the configuration illustrated there because other mechanisms (e.g., the small bridge connecting structures 110 and 120, a connection to a non-illustrated supporting layer or other support structure) are in place that will maintain a physical separation between structures 110 and 120. For example, electrically conductive structures 110 and 120 could each be attached to a ceramic package that would act as an electrical insulator and would therefore electrically insulate the two electrically conductive structures from each other by keeping them physically separate.

The small bridge of material shown in FIG. 2 and mentioned above may itself, if left unaddressed, act as an electrical short between the two electrically conductive structures. There are several possible solutions, however. For example, the bridge may be removed using a polishing operation (and the conductive structure held apart by some other means). Alternatively, the electrically conductive structures may be formed in a heavily-doped top layer or region of a wafer while the trench extends down to an underlying lightly-doped substrate that is not a very good conductor. Or a silicon-on-insulator structure may be used.

As an example, the porous structure of electrically conductive structures 110 and 120 can be created by a wet etch process in which a liquid etchant applied to a surface of the electrically conductive structures etches away portions of the electrically conductive structure in a way that is at least somewhat similar to the way water is able to carve channels in rock. This is why each one of the channels has an opening to the surface of the electrically conductive structure; the wet etch method is incapable of creating fully-enclosed cavities, i.e., cavities with no opening to the surface, like an air bubble trapped inside a rock, within the porous structure. This is not to say that those openings cannot be covered with other materials or otherwise closed up because of the presence of or addition of other materials—that is in fact likely to occur in several embodiments—but, whether covered or not, the described openings to the surface are a feature of each channel in each porous structure according to at least one embodiment of the invention. (One embodiment in which the openings may be covered up is one in which a layer of epitaxial silicon as a location for circuitry or other wiring is grown on top of the channels).

Figure 3A:
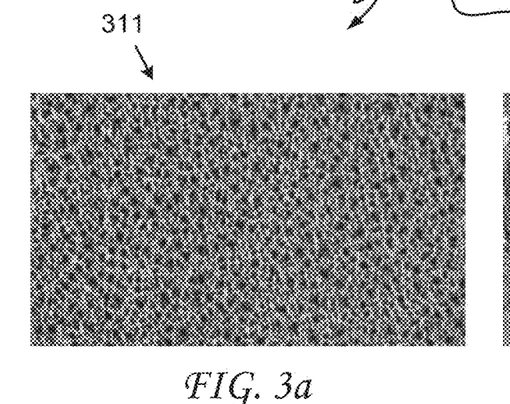
FIGS. 3a and 3b are plan and cross-sectional views, respectively, of a porous structure of an energy storage device according to embodiments of the invention.

It should be noted that the FIG. 1 and FIG. 2 depictions of the porous structures are highly idealized in that, to mention just one example, all of channels 111 and 121 are shown as only extending vertically. In reality the channels would branch off in multiple directions to create a tangled, disorderly pattern that may look something like the porous structure shown in FIG. 3.

Figure 3B:
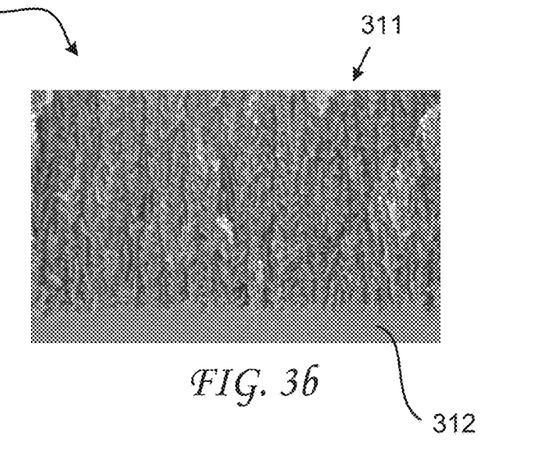

FIGS. 3a and 3b are scanning electron microscope (SEM) images of, respectively, a surface and a cross-sectional slice of a porous structure 300 (in this case porous silicon) according to embodiments of the invention. As illustrated, porous structure 300 contains multiple channels 311. It should be understood that channels 311 are likely to twist and turn along their lengths such that a single channel may have both vertical and horizontal portions as well as portions that are neither completely vertical nor completely horizontal but fall somewhere in between. Note that in FIG. 3b, the channels extend near to but do not quite reach a bottom of the etched structure, thus leaving a layer 312 of un-etched silicon underneath the channels.

With the right etchant, it should be possible to make porous structures having the described characteristics from a wide variety of materials. As an example, a porous silicon structure may be created by etching a silicon substrate with a mixture of hydrofluoric acid and ethanol. More generally, porous silicon and other porous structures may be formed by such processes as anodization and stain etching.

Besides porous silicon, which has already been mentioned, some other materials that may be especially well-suited for energy storage devices according to embodiments of the invention are porous germanium and porous tin. Possible advantages of using porous silicon include its compatibility with existing silicon technology. Porous germanium enjoys a similar advantage as a result of existing technology for that material and, as compared to silicon, enjoys the further possible advantage that its native oxide (germanium oxide) is water-soluble and so is easily removed. (The native oxide that forms on the surface of silicon may trap charge—which is an undesirable result—especially where the silicon porosity is greater than about 20 percent.) Porous germanium is also highly compatible with silicon technology. Possible advantages of using porous tin, which is a zero-band-gap material, include its enhanced conductivity with respect to certain other conductive and semiconductive materials. Other materials may also be used for the porous structure, including silicon carbide, alloys such as an alloy of silicon and germanium, and metals such as copper, aluminum, nickel, calcium, tungsten, molybdenum, and manganese.

Embodiments of the invention may make use of very narrow channels. In certain embodiments (to be described in detail below), an electrolyte is introduced into the channels. For example, the electrolyte may be an organic electrolyte or an ionic liquid. Molecules in the electrolyte may be on the order of 2 nanometers (nm). In at least one embodiment, therefore, a smallest dimension of each one of the channels is no less than 2 nm so as to permit the electrolyte to flow freely along the entire length of the channels.

Forcing (or otherwise enabling) an electrolyte to penetrate deep within the channels increases the overall capacitance of the energy storage device, leading to an increase in energy density. Embodiments of the invention address several other techniques (besides tailoring the size of the channels as mentioned above) for increasing a distance by which the electrolyte penetrates within the channels (with the consequent increases in capacitance and energy density). Described below are several procedures designed to increase a distance by which an electrolyte penetrates within the channels of an energy storage device of a type that has been described herein. The procedures may also allow the use of electrolytes having viscosities that would otherwise be too high. The particulars of each procedure determine whether the electrolyte should be introduced before, during, or after the performance of the procedure (or whether the timing of the electrolyte introduction doesn't matter).

Figure 4:
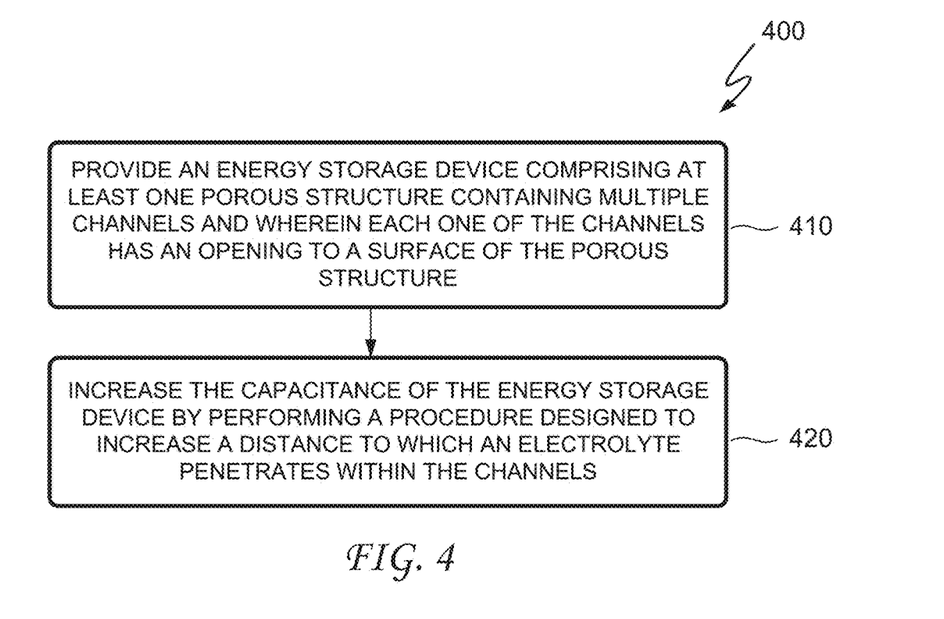
FIGS. 4, 5, 8-10, and 12 are flowcharts illustrating methods of increasing an energy density of an energy storage device according to embodiments of the invention.

FIG. 4 is a flowchart illustrating a method 400 of increasing an energy density of an energy storage device according to an embodiment of the invention. A step 410 of method 400 is to provide an energy storage device comprising at least one porous structure containing multiple channels, wherein each one of the channels has an opening to a surface of the porous structure. In other words, method 400 is directed to an energy storage device of a type described herein.

A step 420 of method 400 is to increase the capacitance of the energy storage device by performing a procedure designed to increase a distance to which an electrolyte (or a precursor or other deposition agent, an ionic fluid, or the like) penetrates within the channels. As mentioned, depending on the procedure the electrolyte may be introduced before, during, or after the performance of the procedure.

One such procedure comprises placing the energy storage device in a vacuum and then applying the electrolyte. Another procedure comprises subjecting the energy storage device to ultrasonic vibration. Still another procedure comprises placing the energy storage device in a centrifuge, in which case it has been found that rotating the centrifuge at a rate of at least 500 rotations per minute works well to drive the electrolyte into the channels as desired. In some embodiments, the channels of the porous structure extend completely through the porous structure. A structure of this kind could be advantageous in forming enhanced energy storage devices in conjunction with electrolyte solutions, separators, and conductive electrodes as described elsewhere in this document. In such continuous-channel embodiments, the penetration distance of an electrolyte (or other substance) can be increased by using a pressure differential, a thermal gradient, osmotic pumping, and the like, as well as ultrasonic vibration, which was mentioned earlier.

Yet another procedure comprises applying a surface treatment to a surface of the channels. In one embodiment, the surface treatment comprises making those surfaces more wettable by depositing a material on surfaces of the channels. There are several materials that have been found to work well for this purpose, including (but not limited to) $TiO_2$, $TiN$, $TaN$, $SiN$, $AlN$, $Al_2O_3$, $HfO_2$, $Ta_2O_5$, $Er_2O_3$, $TiAlN$, and $Nb_2O_5$. Certain of these materials (notably $TiN$, $HfO_2$, and $Ta_2O_5$) work well in conjunction with organic electrolytes; certain others (notably $TiO_2$, $TiN$, and $HfO_2$) work well in conjunction with ionic liquids and solid state electrolytes.

Referring again to FIG. 1, energy storage device 100 further comprises (in the illustrated embodiment) an electrically conductive coating 140 on at least a portion of the porous structure and in at least some of channels 111 and/or channels 121. Such an electrically conductive coating may be necessary in order to maintain or enhance the conductivity of the porous structure—especially where the porosity of the porous structure exceeds about 20 percent. As an example, electrically conductive coating 140 may be a silicide or a germanide. As another example, electrically conductive coating 140 may be a coating of metal or a metal alloy such as, for example, aluminum, nickel, tin, copper, palladium, ruthenium, and tungsten, or other electrical conductors such as carbon (graphene), $WN_2$, $TiN$, $AlTiN$, $TaN$, W—Ti—N, Ti—Si—N, W—Si—N, Ti—B—N, and Mo—N. Each of the listed materials has the advantage of being used in existing CMOS technology. Furthermore, the noble metals may be of particular interest in cases where superior resistance to oxidation is desired. Other metals such as nickel and calcium as well as silicides or germanides of any of the foregoing may also be used. These materials may be applied using processes such as electroplating, chemical vapor deposition (CVD), and/or atomic layer deposition (ALD).

Figure 5:
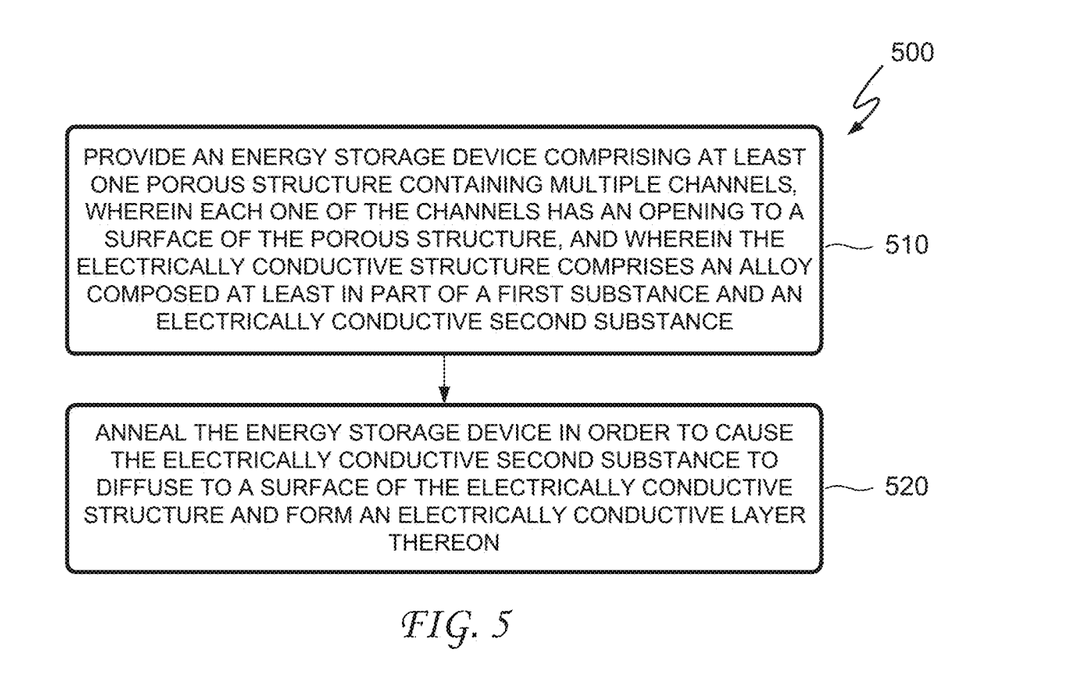

In cases where the at least one electrically conductive structure of the energy storage device comprises an alloy composed at least in part of a first substance and an electrically conductive second substance, an alternative application method may be employed. This method (also described below as method 500) involves annealing the energy storage device in order to cause the electrically conductive second substance to diffuse to a surface of the electrically conductive structure and form an electrically conductive layer thereon. It should be understood that the surface on which the electrically conductive layer is formed includes the interior surfaces within the channel and not just the surface (e.g., surface 115 or surface 125) in which the channel is formed.

FIG. 5 is a flowchart illustrating a method 500 of increasing an energy density of an energy storage device according to an embodiment of the invention. A step 510 of method 500 is to provide an energy storage device comprising at least one porous structure containing multiple channels, wherein each one of the channels has an opening to a surface of the porous structure. Additionally, the electrically conductive structure comprises an alloy composed at least in part of a first substance and an electrically conductive second substance. In other words, method 500 is directed to an energy storage device of a type described herein.

A step 520 of method 500 is to anneal the energy storage device in order to cause the electrically conductive second substance to diffuse to a surface of the electrically conductive structure and form an electrically conductive layer thereon.

As one example, the alloy may be silicon carbide (SiC). This substance may be applied to at least some of the channels of an energy storage device of the kind described herein using, for example, any of the techniques listed above. Following such application, an anneal may be performed. The anneal causes the carbon in the SiC to diffuse to the surface of the SiC alloy and form a layer of electrically conductive graphite (or other electrically conductive carbon allotrope). It should be noted that after the anneal takes place the material may no longer exhibit the configuration that characterizes the alloy. It therefore may at that point be misleading to continue referring to the material as an alloy. For SiC, for example, the carbon, after the performance of the anneal, will have diffused out of the alloy to form the described electrically conductive layer and what remains is some amalgamation of silicon and carbon—call it Si—C— and not necessarily the precise substance known as SiC.

Figure 6:
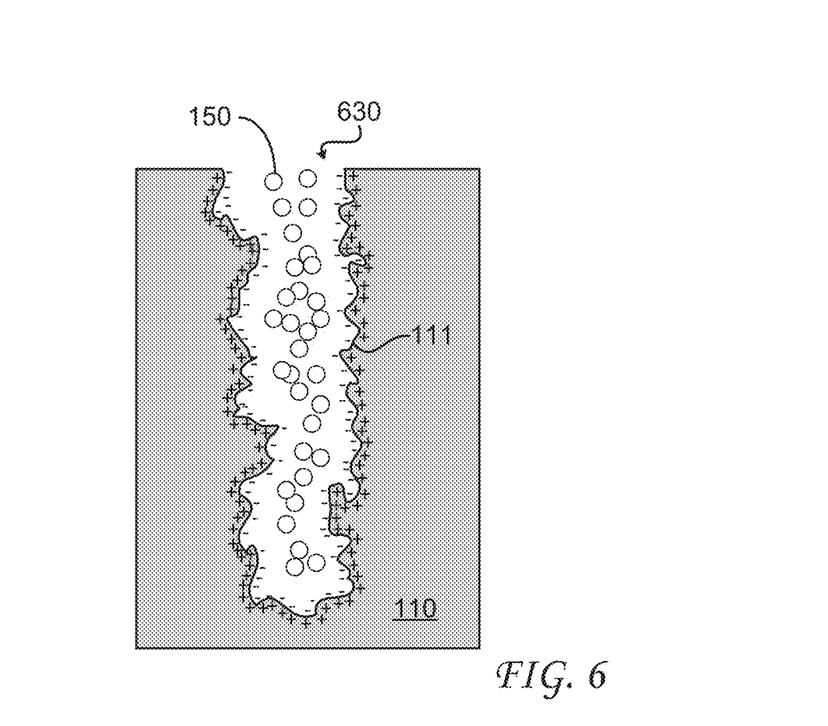
FIG. 6 is a schematic depiction of an electric double layer formed within an energy storage device according to an embodiment of the invention.

In an embodiment where electrolyte 150 is used, an electric double layer is formed within the channels of the porous structure as depicted schematically in FIG. 6. In that figure, an electrical double layer (EDL) 630 has been formed within one of channels 111. EDL 630 is made up of two layers of ions, one of which is the electrical charge of the sidewalls of channel 111 (depicted as being positive in FIG. 6 but which could also be negative) and the other of which is formed by free ions in the electrolyte. EDL 630 electrically insulates the surface, thus providing the charge separation necessary for the capacitor to function. The large capacitance and hence energy storage potential of electrolytic ultracapacitors arises due to the small (approximately 1 nm) separation between electrolyte ions and the electrode.

In some embodiments of the invention, a dielectric material may be placed between the electrolyte and the porous structure in order to further enhance the capacitance of the energy storage device. The following paragraphs are directed to methods according to embodiments of the invention in which a capacitance (and hence the energy storage density) of an energy storage device (having a porous structure of a type described herein) is increased by placing a dielectric material into the porous structure along with an electrolyte or an ionic liquid. It should be mentioned here that certain embodiments of the invention are independent of an added dielectric; these embodiments involve simply the ionic liquid (or other electrolyte) in the porous structure. It should also be mentioned here that dielectric materials may be introduced into the channels for other reasons besides increasing capacitance. Other motivations for adding dielectric materials include surface passivation and wettability enhancement, both of which are addressed below.

Figure 7:
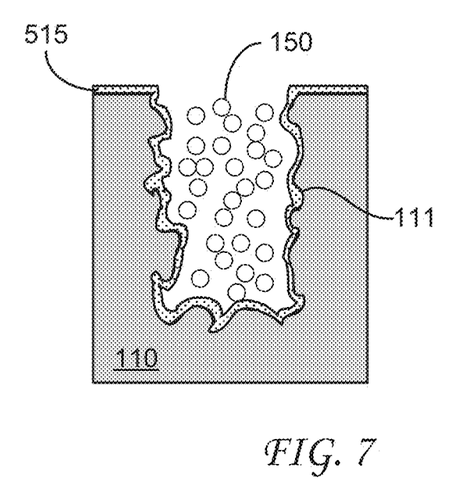
FIG. 7 is a cross-sectional view of a channel of an energy storage device according to an embodiment of the invention.

FIG. 7 is a cross-sectional view of one of channels 111 of energy storage device 100 according to an embodiment of the invention in which a dielectric material 515 is located between electrolyte 150 and porous structure 110. (The EDL is not shown in FIG. 7 in order to avoid unnecessarily complicating the drawing.)

Figure 8:
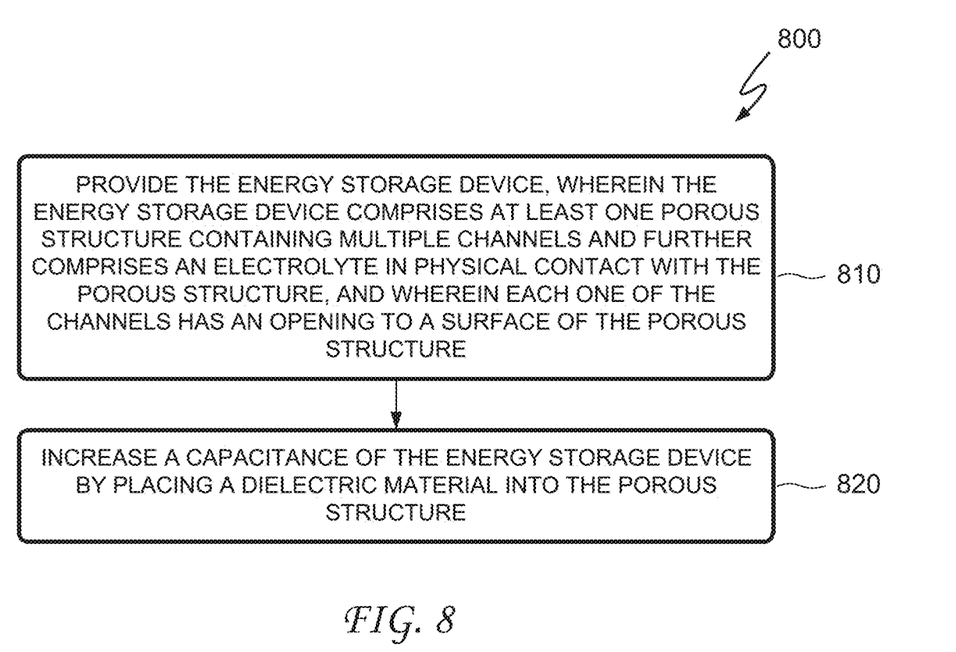

FIG. 8 is a flowchart illustrating a method 800 of increasing an energy density of an energy storage device according to an embodiment of the invention. A step 810 of method 800 is to provide an energy storage device comprising at least one porous structure containing multiple channels, wherein each one of the channels has an opening to a surface of the porous structure. Additionally, the energy storage device further comprises an electrolyte in physical contact with the porous structure. In other words, method 800 is directed to an energy storage device of a type described herein.

A step 820 of method 800 is to increase a capacitance of the energy storage device by placing a dielectric material into the porous structure. Any of several methods may be used to accomplish step 820. In various embodiments such placement may be accomplished using an electrografting nanotechnology process, a hydrothermal growth process, an electroplating process, and an atomic layer deposition process. Any of these approaches may be suitable for filling high aspect ratio structures with dielectric materials. Electrografting and hydrothermal growth techniques may be less expensive than ALD, and may be better suited to high volume manufacturing. Electroplating is a widely-used, cost-effective technique that can be used to deposit elemental metallic conductors. In one particular embodiment, nickel may be electroplated onto a silicon substrate in order to achieve porous nickel silicide. On the other hand, ALD works very well with higher aspect ratios and permits deposition into smaller openings that do not have to be electrically conductive.

Additional methods for placing the dielectric material into the porous structure include a sol-gel synthesis process and a venetian glass approach. Sol-gel synthesis is a chemical process in which the material of interest is created using chemistry instead of using (expensive) vacuum deposition equipment; this method is well-suited for introducing nanoparticles having very high dielectric constants (for boosting capacitance) into high aspect ratio channels (provided the channel openings are wide enough for the nanoparticles to fit within them). A venetian glass approach is good for making long fibers with high surface area out of high-k dielectric materials (defined herein as materials having a dielectric constant of 3.9 or above).

One way in which a dielectric material can increase the capacitance (and therefore the energy density) of an energy storage device is by increasing an overall dielectric constant of the energy storage device, while another way is by increasing the surface wettability for an electrolyte. (Recall from above that dielectric materials may in some (though not necessarily all) embodiments be used in conjunction with electrolytes.) Yet another way is through surface passivation: a dielectric material can be used to chemically interact with dangling bonds at surfaces of the energy storage device and thus render them chemically inert. In one example, a $TiO_2$ layer (0.5 nm thick) was deposited on a porous silicon structure in order to passivate the silicon surface. An electrically conductive TiN film was then deposited over the $TiO_2$ (for reasons that will be discussed below). One advantage of such passivation is that it counteracts the effects of hydrogen desorption (an effect observed at temperatures of 350° C. and above—a range that may be used for ALD) that, if left unaddressed, can cause the energy storage device to glow red hot as a result of an interaction between dangling bonds at the surfaces of the device and the surrounding air.

Stated simply, the wettability of a material is a measure of the degree to which a liquid is able to spread out over a surface of that material. If a droplet of the liquid is able to completely spread out and form a film on the material's surface (i.e., where the contact angle between the droplet and the surface is zero), the material is said to be perfectly wettable. In the context of the present discussion, greater wettability is preferred because the greater degree of spreading it allows leads to higher capacitances and energy densities. More particularly, a greater wettability assists in the process of driving the electrolyte down deeper within the channels.

In light of the foregoing, in some embodiments of the invention increasing an overall dielectric constant of the energy storage device is done by introducing (for example by using one of the methods mentioned above) a dielectric material having a dielectric constant higher than that of the electrolyte (e.g., higher than the dielectric constant of the solvent of an organic electrolyte). In other embodiments a material is introduced that improves a wettability of the surface of the porous structure for the electrolyte. (In other words, the material allows the electrolyte to flow more easily across the surface of the porous structure.) This latter material might be one that has a dielectric constant lower than that of the electrolyte, or it might be one that, like the dielectric material mentioned in the first sentence of this paragraph, has a dielectric constant higher than that of the electrolyte (in which case it would be especially conducive to capacitance increases and would therefore be especially advantageous).

Various candidates have been discovered for the dielectric constant- and wettability-increasing materials discussed above. As a first example, $TiO_2$ may be deposited by ALD and may, because it is diffusion limited, travel all the way to the ends of high aspect ratio channels. A substance is characterized herein as "diffusion limited" if it reacts slowly enough that it diffuses—that is, travels—the entire length of the channel before it reacts and creates a blockage therein. This property is determined at least in part by the reactive sticking coefficient and the nanopore size. A diffusion limited substance stands in contrast to a "reaction limited" substance, which undergoes a reaction before traversing the entire length of the channel, thereby blocking the channel. In one embodiment, $TiO_2$ increased the wettability of the surface of the energy storage device to such a degree that a ten-fold increase in capacitance was observed. In various embodiments, an electrolyte—perhaps having a dielectric constant slightly higher than the $TiO_2$—may subsequently be introduced into the channels. Good results have been obtained using both organic electrolytes and ionic liquids, with higher capacitance generally being observed with the former and higher voltages generally being observed with the latter. Other examples of acceptable materials—several (though not all) of which, advantageously, have dielectric constants greater than 40—include $HfO_2$, HfTaO, HfTiON, HfTaON, Hf—Ti—Ta—O, $HfSiO_4$, $HfTiO_4$, $HfAlO_3$, HfBiON, $Ta_2O_5$, $Nb_2O_5$, $TiO_2$, $BaTiO_3$, $BaSrTiO_3$ (BST), $BaZrO_3$, $ZrTiO_4$, $ZrO_2$, $La_2O_3$, $Si_3N_4$, $SrTiO_3$ (STO), $Al_2O_3$, and $Er_2O_3$. (Of these, at least $Ta_2O_5$ and $TiO_2$ are also very good wetting agents, as mentioned above, and thus are doubly advantageous.) The substances containing aluminum and hafnium were observed to react more quickly than what might be considered ideal (i.e., they were somewhat reaction limited), but might both be useful in at least certain embodiments in spite of that. Substances containing strontium tend to cause the dielectric constant to drop—an undesirable result—but at the same time tend to decrease leakage and increase breakdown voltage—both of which are desirable results.

In some embodiments, as has been mentioned, the electrolyte is an ionic liquid. Ionic liquids are in some cases preferable to organic electrolytes because ionic liquids can increase the breakdown voltage of the energy storage device. This is especially desirable because energy increases with the square of the voltage according to Equation 1, meaning that even small increases in available voltage yield larger increases—sometimes much larger increases—in energy storage capacity. Examples of ionic liquids (with double layer capacitance (if known) in units of $\mu F/cm^2$ shown in brackets following each name) include: IMIM-$BF_4$ (1-Ethyl-3-methylimidazolium Tetraflouroborate), EMIM $BF_4$ [10.6], EMIM OTF [12.4], EMIM NTF [11.7], 1.5M EMI-TfSI/PC [9.1], 1M $Et_4NBF_4$/PC [7.0], 0.1M $KCl/H_2O$ [15.1], 3M $H_2SO_4/H_2O$ [14.6], BMPL NTF (1-Butyl-1-methylpyrrolidinium bis(trifluoromethylsulfonyl)imide), PDEA NTF (Ethyl-dimethyl-propylammonium bis(trifluoromethylsulfonyl)imide), and EMIM FAP (1-Ethyl-3-methylimidazolium tris(pentafluoroethyl)trifluorophosphate). For each substance, either the pure ionic liquid or its acetonitrile mixture/solution may be used.

Figure 9:
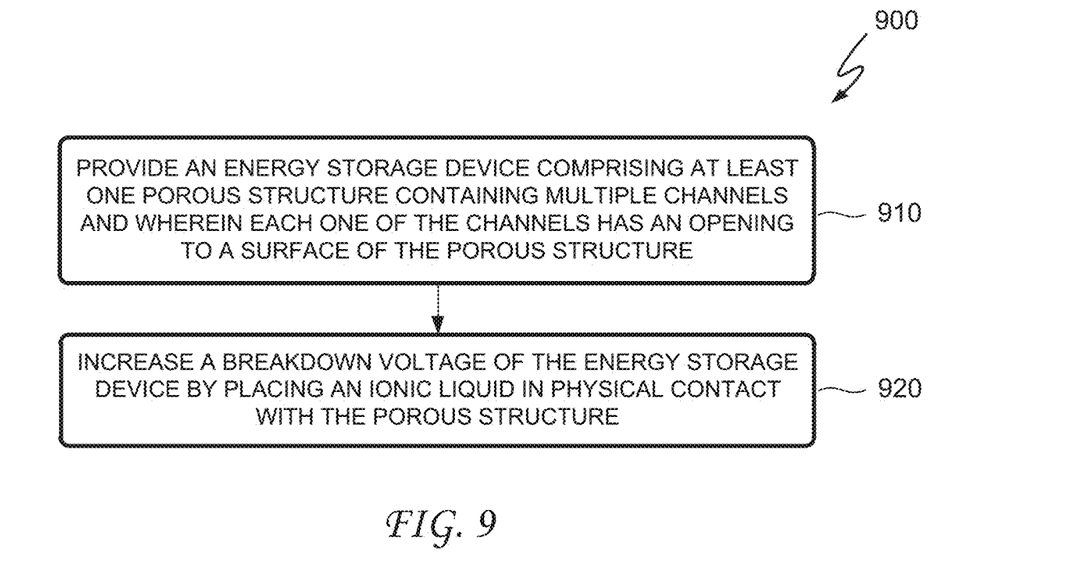

FIG. 9 is a flowchart illustrating a method 900 of increasing an energy density of an energy storage device according to an embodiment of the invention directed at least in part to increasing a breakdown voltage of the energy storage device. A step 910 of method 900 is to provide an energy storage device comprising at least one porous structure containing multiple channels, wherein each one of the channels has an opening to a surface of the porous structure. In other words, method 900 is directed to an energy storage device of a type described herein.

A step 920 of method 900 is to increase a breakdown voltage of the energy storage device by placing an ionic liquid in physical contact with the porous structure. In various embodiments, the electrolyte may be used in conjunction with a dielectric material in ways and for reasons such as those that have been discussed above. Accordingly, the dielectric material can in some embodiments have a dielectric constant higher than that of the electrolyte and/or can improve a wettability of the surface of the porous structure for the ionic liquid.

The foregoing discussion included a reference to the deposition of a dielectric material into the porous structure of an energy storage device, and as part of that discussion it was mentioned that the deposition may be accomplished using ALD. The ALD concept will now be revisited in a slightly more general context in connection with additional embodiments of the invention and with reference to FIG. 10, which is a flowchart illustrating a method 1000 of increasing an energy density of an energy storage device in accordance with an embodiment of the invention.

Figure 10:
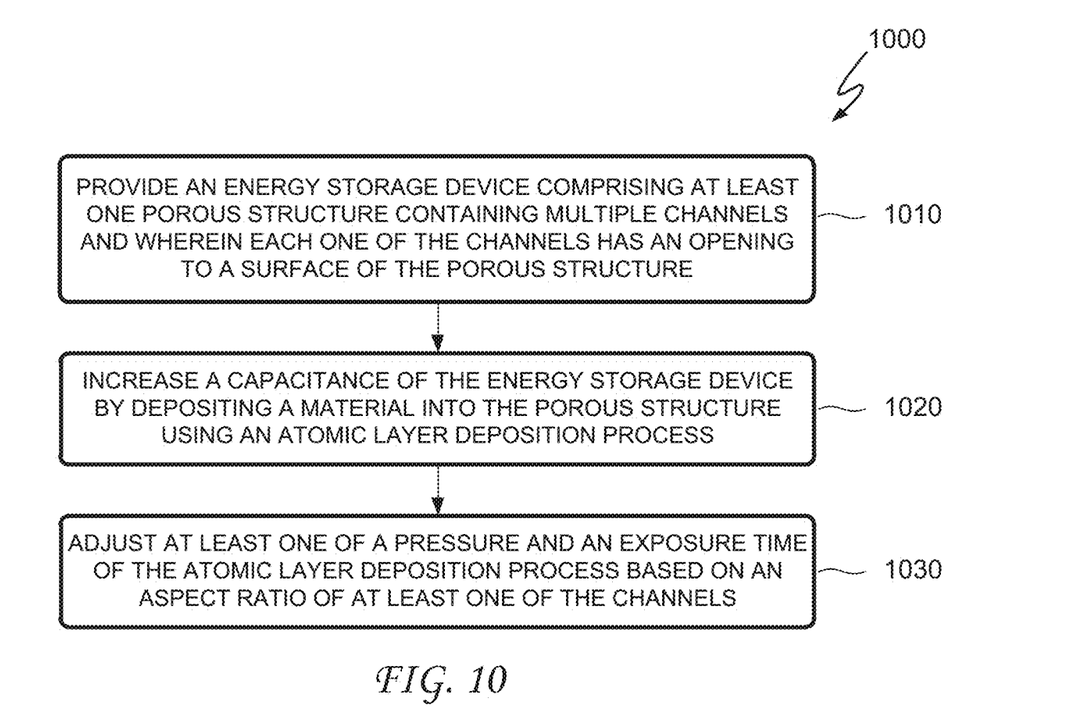

A step 1010 of method 1000 is to provide an energy storage device comprising at least one porous structure containing multiple channels, wherein each one of the channels has an opening to a surface of the porous structure. In other words, method 1000 is directed to an energy storage device of a type described herein.

A step 1020 of method 1000 is to increase a capacitance of the energy storage device by depositing a material (not necessarily a dielectric material) into the porous structure using an atomic layer deposition process. Through-substrate ALD can be used to coat channels in the porous structure for wafers that are etched completely through, in which case the deposition process may be much faster. In one embodiment this may be done using a roll-to-roll ALD process. In another embodiment, the process may be accomplished using a batch ALD reactor that can operate between 0.1 and 760 Torr. Another advantage of using ALD is that it can help terminate the bonds at the surface or improve the wettability of the surface. As has been mentioned elsewhere herein, increasing the wettability allows an electrolyte to penetrate deeper into the channels of the porous structure, thereby increasing capacitance. Terminating surface bonds might alter the charging/discharging behavior of the capacitor so that it is more physical and less chemical. More specifically, it has been found that some of the energy of the energy storage device is actually being stored as a surface reaction, and that reduces the device's power. An ALD-deposited material placed within the channels of the porous structure can terminate dangling bonds at the surfaces of the channels in order to mitigate this effect.

A step 1030 of method 1000 is to adjust at least one of a pressure and an exposure time of the atomic layer deposition process based on an aspect ratio of at least one of the channels.

In one embodiment, the aspect ratio is at least $10^3$ and for each precursor in a cycle the exposure time is at least 10 seconds and the pressure is at least 0.1 Torr. Of course, lower pressures will also work as long as longer exposure times are accepted. Similarly, shorter times can be achieved at even higher pressures. At relatively higher pressures and/or longer times, the amount of precursor used can become substantial. In order to reduce the precursor amount, and therefore the related cost, embodiments of the invention make use of the "stop-flow" ALD technique, in which the precursor flow is stopped during the exposure time so as to reduce the amount of precursor used.

Many cycles are typically needed in order to deposit an ALD film, and within each cycle two precursors are typically alternated—with a purge cycle in between to remove one precursor before the other one is introduced. (The second of the two precursors to be introduced is sometimes referred to as the coreactant.) ALD purge cycles are usually performed using an inert gas such as $N_2$ or Ar. In some circumstances a vacuum purge may also be used, as this additional purge may be necessary to completely remove precursors/coreactants and byproducts and to avoid undesirable chemical vapor deposition processes. In one particular case, a $TiO_2$ film about 4-5 nanometers thick was deposited using a 40-cycle ALD process at 400° C. in which each cycle incorporated a 20-second exposure to $TiCl_4$ followed by a 180-second purge, a 10-second exposure to $H_2O$, and another 180-second purge.

An ALD process can also be used to increase an achievable power output of an energy storage device, as can other processes that are discussed herein and/or are known in the art. These concepts will now be discussed in connection with FIG. 11, which is a flowchart illustrating a method 1100 according to an embodiment of the invention.

Figure 11:
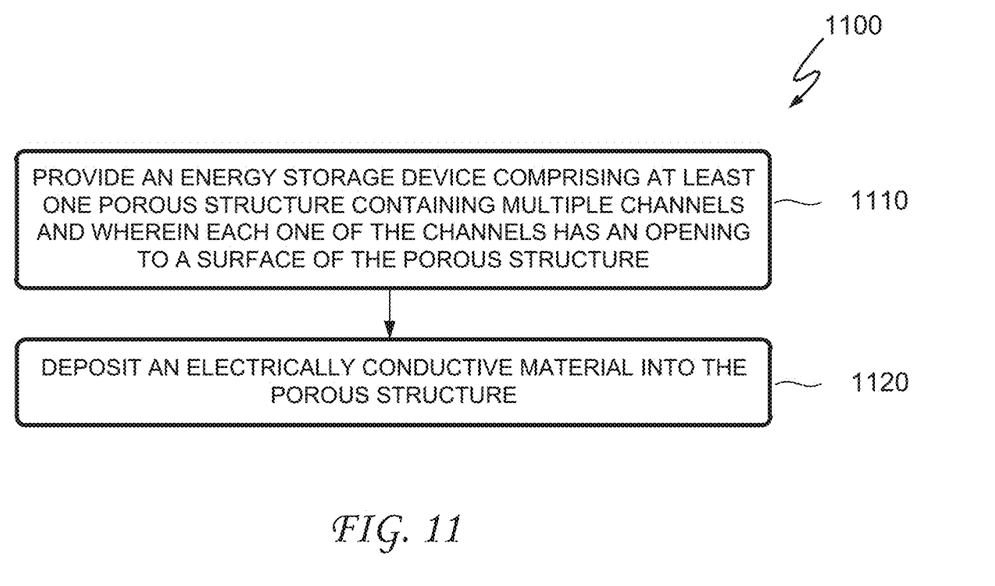
FIG. 11 is a flowchart illustrating a method of increasing an achievable power output of an energy storage device according to an embodiment of the invention.

A step 1110 of method 1100 is to provide an energy storage device comprising at least one porous structure containing multiple channels, wherein each one of the channels has an opening to a surface of the porous structure. In other words, method 1100 is directed to an energy storage device of a type described herein.

A step 1120 of method 1100 is to deposit an electrically conductive material into the porous structure. The electrically conductive material in the porous structure reduces effective series resistance (ESR), thereby improving performance. For example, a device having lower ESR is able to deliver higher power (which may be manifested in terms of greater acceleration, more horse power, etc.). In contrast, higher ESR (a condition that prevails inside a typical battery) limits the amount of available energy, at least partially due to the fact that much of the energy is wasted as heat. Examples of suitable electrically conductive materials include, but are not limited to, tungsten, aluminum, copper, nickel, carbon (graphene), palladium, ruthenium, tin, and alloys including AlTiN, TiN, $WN_2$, TaN, W—Ti—N, Ti—Si—N, W—Si—N, Ti—B—N, and Mo—N. In one scenario, a very conductive TiN film (resistivity as low as ~20 μohm-cm) could be deposited using an ALD process at substrate temperatures of ~300-400° C. In another scenario, oxygen co-reactant based ALD processes could be used to deposit Pd or Ru.

In one embodiment, step 1120 is accomplished using an atomic layer deposition process. In another embodiment, step 1120 is accomplished using an electroplating process. As mentioned above, other deposition and material formation processes are also possible.

In another embodiment, step 1120 may be combined with the deposition of a dielectric in order to form a conductor-dielectric bi-layer on top of which an electrolyte may be added. Depending on the materials chosen, good results may be obtained for reduced ESR, increased capacitance and/or breakdown voltage, and so forth. In certain embodiments the materials may be deposited using ALD, but any of the deposition techniques disclosed herein or as known in the art may be used. One advantage of using ALD in this scenario is that the conductive layer and the dielectric layer can be deposited (sequentially) in the same deposition chamber, thus representing some cost savings.

Several methods of increasing an energy storage density of an energy storage device have been disclosed herein. Another such method will now be discussed in connection with FIG. 12, which is a flowchart illustrating a method 1200 according to an embodiment of the invention.

Figure 12:
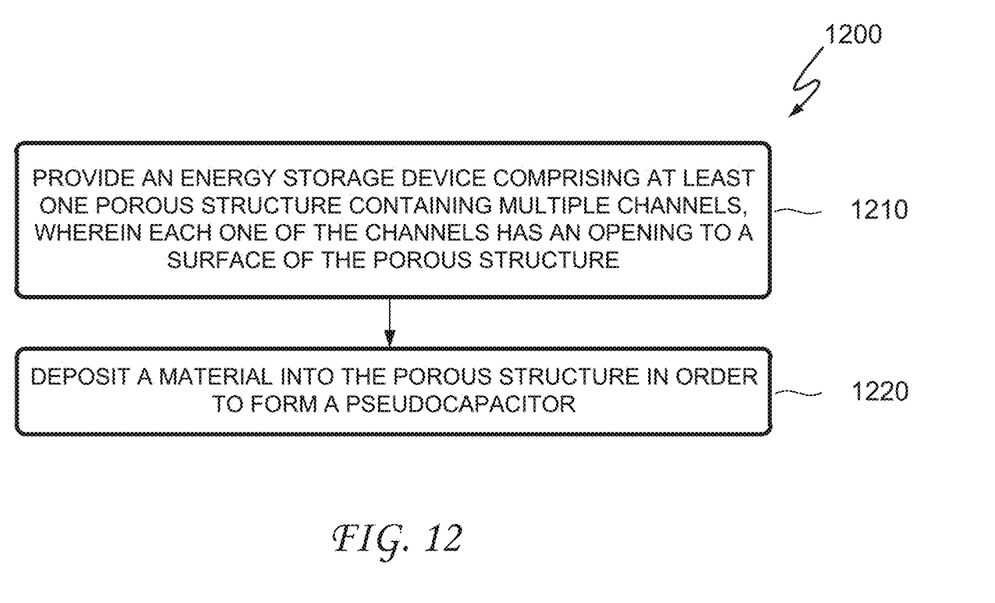

A step 1210 of method 1200 is to provide an energy storage device comprising at least one porous structure containing multiple channels, wherein each one of the channels has an opening to a surface of the porous structure. In other words, method 1200 is directed to an energy storage device of a type described herein.

A step 1220 of method 1200 is to deposit a material into the porous structure in order to form a pseudocapacitor. In some embodiments the material can be a transition metal oxide such as, for example, $MnO_2$, $RuO_2$, $NiO_x$, $Nb_2O_5$, or $V_2O_5$. In other embodiments the material could be WC or a conducting polymer. In the same or other embodiments, depositing the material into the porous structure is accomplished using an atomic layer deposition process. Other deposition or formation methods are also possible.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the energy storage device and the related structures and methods discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An energy storage device comprising:
    at least one porous structure containing multiple channels and further comprising an electrolyte in physical contact with the at least one porous structure, wherein each one of the multiple channels has an opening to a surface of the at least one porous structure;
    an electrically conductive material in the at least one porous structure;
    wherein:
    the electrically conductive material comprises an electroplated material;
    the at least one porous structure comprises silicon; and
    the electrically conductive material is TiN; and a passivation layer between the silicon and the electrically conductive material, the passivation layer comprising $TiO_2$.

2. The energy storage device of claim 1, wherein: at least some of the multiple channels extend completely through the at least one porous structure.

3. The energy storage device of claim 1, wherein: the electrolyte is an ionic liquid.

4. The energy storage device of claim 3, wherein: the ionic liquid is one of $IMIM\text{-}BF_4$, $EMIM\ BF_4$, EMIM OTF, EMIM NTF, 1.5M EMI-TfSI/PC, 1M $Et_4NBF_4$/PC, 0.1M $KCl/H_2O$, 3M $H_2SO_4/H_2O$, BMPL NTF, PDEA NTF, or EMIM FAP.

5. The energy storage device of claim 1, further comprising a material that forms a pseudocapacitor.

6. The energy storage device of claim 5, wherein: the material is a transition metal oxide.

7. The energy storage device of claim 6, wherein: the transition metal oxide is one of $MnO_2$, $RuO_2$, $NiO_x$, $Nb_2O_5$, or $V_2O_5$.

\* \* \* \* \*